United States Patent [19]

Gibson

[11] Patent Number: 5,598,602
[45] Date of Patent: Feb. 4, 1997

[54] DIPSTICK OIL WIPER

[76] Inventor: Walter L. Gibson, 4082 El Paso St., Jackson, Miss. 39206

[21] Appl. No.: 556,128

[22] Filed: Nov. 9, 1995

[51] Int. Cl.⁶ .......................... G01F 15/12; F01M 11/12
[52] U.S. Cl. .......................................................... 15/220.4
[58] Field of Search ........................... 15/210.1, 220.4, 15/244.2, 244.1, 143, 256.51, 256.6, 209.1; 81/427.5

[56] References Cited

U.S. PATENT DOCUMENTS

| | | | |
|---|---|---|---|
| 1,947,833 | 2/1934 | Dolbier | 15/210.4 |
| 2,222,191 | 11/1940 | Zisman | 15/220.4 |
| 2,713,228 | 7/1955 | Grunwald | 15/256.6 |
| 3,460,181 | 8/1969 | Denver | 15/210 |
| 3,686,702 | 8/1972 | Jordan . | |
| 3,703,038 | 11/1972 | Smith . | |
| 4,017,935 | 4/1977 | Hernandez . | |
| 4,110,909 | 9/1978 | Mayr et al. . | |
| 4,164,054 | 8/1979 | Hanson et al. . | |
| 4,233,704 | 11/1980 | Sartorio . | |
| 4,245,367 | 1/1981 | Stoute | 15/220.4 |
| 4,374,445 | 2/1983 | Wilson | 15/220.4 |
| 4,419,781 | 12/1983 | Meegan . | |
| 4,422,204 | 12/1983 | Long, Jr. . | |
| 4,506,402 | 3/1985 | Long, Jr. . | |
| 4,558,520 | 12/1985 | Forde, Jr. . | |
| 4,658,462 | 4/1987 | Elassar . | |
| 4,860,401 | 8/1989 | Deveaux . | |
| 4,942,669 | 7/1990 | Schnedl . | |
| 4,975,998 | 12/1990 | Anderson et al. . | |
| 5,018,237 | 5/1991 | Valley | 15/244.1 |
| 5,099,584 | 3/1993 | Williams . | |
| 5,231,728 | 8/1993 | Schillinger . | |
| 5,253,557 | 10/1993 | Dolak | 81/427.5 |
| 5,333,347 | 8/1994 | Stranders | 15/21.1 |

FOREIGN PATENT DOCUMENTS

| | | | |
|---|---|---|---|
| 532889 | 11/1956 | Canada | 15/220.4 |
| 69805 | 12/1958 | France | 15/220.4 |
| 297537 | 6/1932 | Italy | 15/220.4 |

*Primary Examiner*—David Scherbel
*Assistant Examiner*—Tony G. Soohoo
*Attorney, Agent, or Firm*—L. Jager Smith, Jr.

[57] ABSTRACT

A dipstick oil wiper adapted for mounting on a dipstick tube, and having a swing arm that can be swung into place over a dipstick as it is withdrawn from the dipstick tube. A frame and an easily replaceable wiping sponge are provided on the upper end of the swing arm, such that the sponge is engaged with the dipstick when the swing arm is moved into position against the dipstick. The dipstick is drawn past the sponge, cleaning the dipstick. Once the cleaning operation is completed, the swing arm is moved such that the wiper is clear of the dipstick.

8 Claims, 5 Drawing Sheets

DIPSTICK OIL WIPER

FIELD OF THE INVENTION

The present invention relates to a novel apparatus to be installed on the oil dipstick tube of an engine or other device that uses an oil reservoir, which apparatus is used to clean the oil from the dipstick when a user checks the reservoir oil level.

BACKGROUND OF THE INVENTION

Most engines in trucks and passenger automobiles, as well as other reciprocating engines and devices as are found on generators, large air conditioning systems and other equipment, use oil as a lubricant. Typically, these engines have a reservoir wherein the oil is collected and stored. Most often, a dipstick is provided on these engines, guided into the oil reservoir by a tube, to allow users periodically to check the oil level. Because proper oil levels are critical to insure proper operation of most engines, it is desirable that the oil levels be checked frequently.

To check the oil level in a reservoir as described above, it is typically necessary for the user to remove the dipstick from the reservoir, to wipe the existing oil off the dipstick, to return the dipstick to its fully inserted position, and then to retract the dipstick for the oil reading. If the wiping operation does not take place, oil that has splashed on the dipstick in the reservoir from engine vibration or movement may result in an erroneous oil level reading.

Wiping off the dipstick typically requires that the user locate a rag or other suitable implement to use to clean the dipstick. The unavailability of a handy cleaning implement may lead some engine operators not to check the reservoir oil levels at the appropriate frequency.

The present invention is adapted to provide a ready means, mounted directly onto the engine dipstick tube, to clean the oil dipstick. The ready accessibility of the present invention is designed to encourage engine operators to check reservoir oil levels frequently.

There are other, more complex, devices designed to clean dipsticks and designed to be mounted on the dipstick tube. Examples of these devices may be seen in U.S. Pat. Nos. 4,506,402 and 4,658,462. Other devices to be mounted on the dipstick tube are simpler, but provide a limited wiping surface. See, for example, U.S. Pat. No. 4,017,935.

There are dipstick wipers available that mount on the dipstick itself. See U.S. Pat. Nos. 4,110,909 and 3,703,038 for examples of these devices. A device that requires mounting on the dipstick may preclude proper insertion of the dipstick that was provided by the original equipment manufacturer into the oil reservoir.

Still other devices provide wipers that may be mounted almost anywhere within an engine compartment, but that are not necessarily readily available at the dipstick tube to wipe the oil off the dipstick as it is withdrawn from the reservoir. Examples of dipstick wipers that may be mounted anywhere within an engine compartment may be seen in U.S. Pat. Nos. 4,419,781, 4,233,704, 4,164,054, and 3,686,702.

It is accordingly a feature of the present invention that a dipstick oil wiper is provided that is mounted on the dipstick tube on an engine, for easy use in the cleaning operation. It is a further feature of the invention that the wiper is of simple construction, being inexpensive to construct, and requiring no modifications to the dipstick or the dipstick tube. It is a further feature of the invention that a wiper is provided having an easily replaceable wiping surface.

SUMMARY OF THE INVENTION

The present invention provides a wiper for use in cleaning an oil reservoir dipstick, that mounts on the oil dipstick tube on an engine. The wiper comprises mounting means for use in attaching the wiper to the dipstick tube, a swing arm pivotally attached to the mounting means, a frame rigidly attached to the swing arm, and a sponge or other wiping medium removably attached to the frame. In operation, a user pulls the dipstick partially from the tube, and swings the swing arm toward the dipstick such that the wiper frame surrounds the dipstick. The user grasps the frame with one hand and presses the frame toward the dipstick, thereby pushing the sponge or other wiping medium against the dipstick, and the user then pulls the dipstick the rest of the way out of the dipstick tube. In so doing, the dipstick is pulled over the sponge or other wiping medium, cleaning any oil off of the dipstick. The user then swings the swing arm away from the dipstick tube, permitting the user to reinsert the dipstick for the oil level measurement.

The sponge or other wiping medium is removably attached to the frame of the wiper, such that when the sponge or other wiping medium has become saturated with oil, it may be easily replaced. The replaceable sponges or other wiping media are removably attached to the wiper frame by means of a Velcro attachment commonly known as a hook and loop fastener.

BRIEF DESCRIPTION OF THE DRAWINGS

The organization and manner of the structure and operation of the invention, together with further advantages thereof, may be best understood by reference to the following description, taken in connection with the accompanying drawings, wherein like reference numerals identify like elements in which.

DETAILED DESCRIPTION OF SPECIFIC EMBODIMENTS OF THE INVENTION

Figure 1:
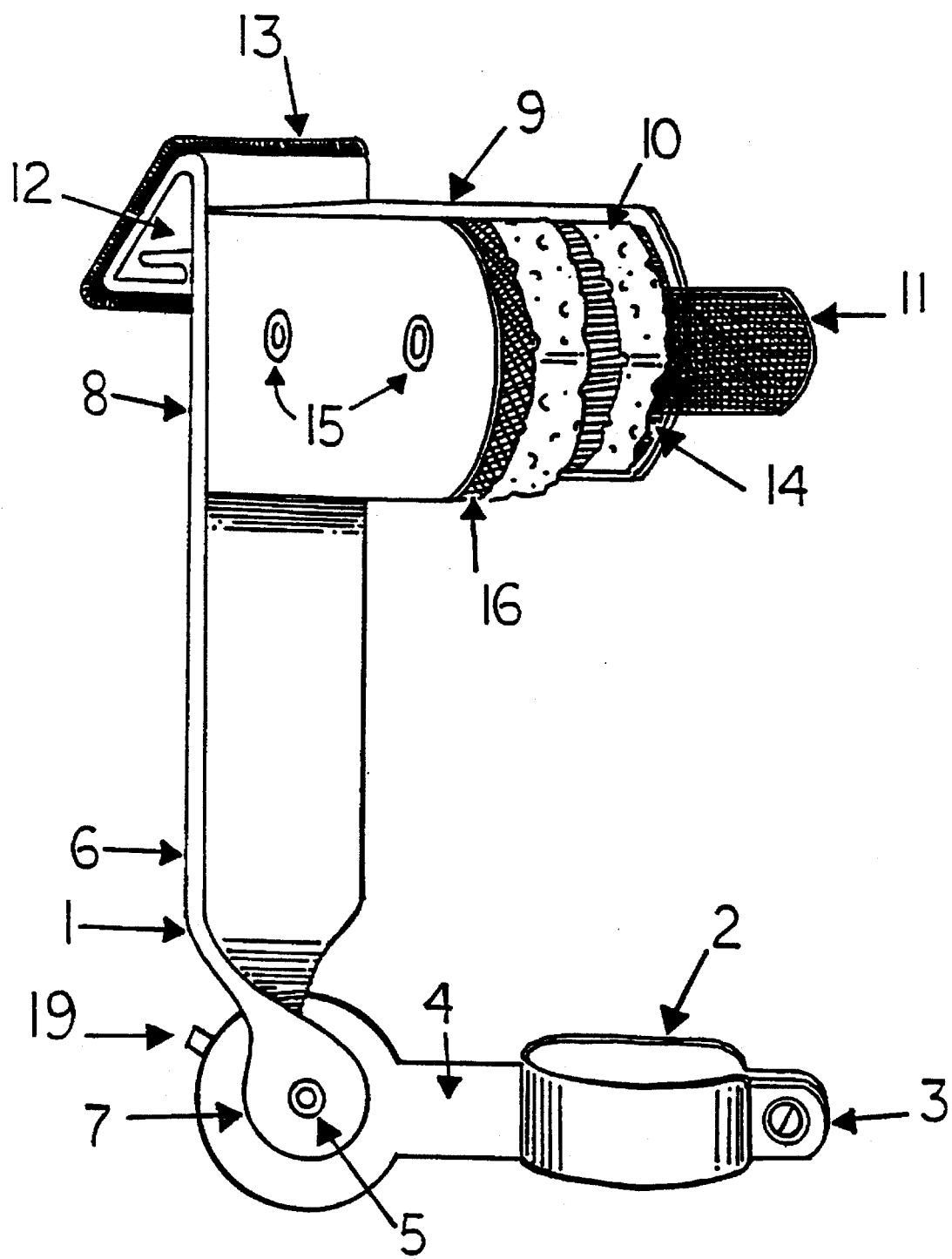
FIG. 1 is a view of the complete wiper, including a wiping sponge.

Referring to FIG. 1, a view of a wiper 1 in accordance with the present invention is shown. In FIG. 1, a clamp 2 is provided as the means for mounting the wiper 1 on a dipstick tube. A fastener 3 is provided on clamp 2 to secure clamp 2 to the dipstick tube. In this embodiment, on the opposite side of clamp 2 from fastener 3 is located tab 4. Swing arm 6 is pivotally mounted to tab 4 at the lower end 7 of swing arm 6 by means of fastener 5. At the upper end 8 of swing arm 6 is rigidly mounted frame 9. A Velcro surface 14 is permanently attached to frame 9 in this embodiment by means of rivets 15. A mating Velcro surface 16 is attached both to sponge 10 and Velcro surface 14, allowing sponge 10 and Velcro surface 16 to be removed from the wiper and replaced periodically. Although the embodiment shown uses a sponge for a wiping medium, other suitable materials may be used in lieu of sponge, such as felt. A Velcro tab 11 is provided on Velcro surface 16 to facilitate removal of sponge 10 and Velcro surface 16 from frame 9. The embodiment shown includes a handle 12 located at the upper end 8 of swing arm 6 to facilitate movement of the swing arm 6 into proper position on the dipstick. In this embodiment, handle 12 is provided with an insulating coating 13 such as rubber. Tang 19 is provided on tab 4 to limit the pivoting motion of swing arm 6 so that swing arm 6 does not fall to a position parallel with the dipstick tube when the wiper is not in use.

Figure 2:
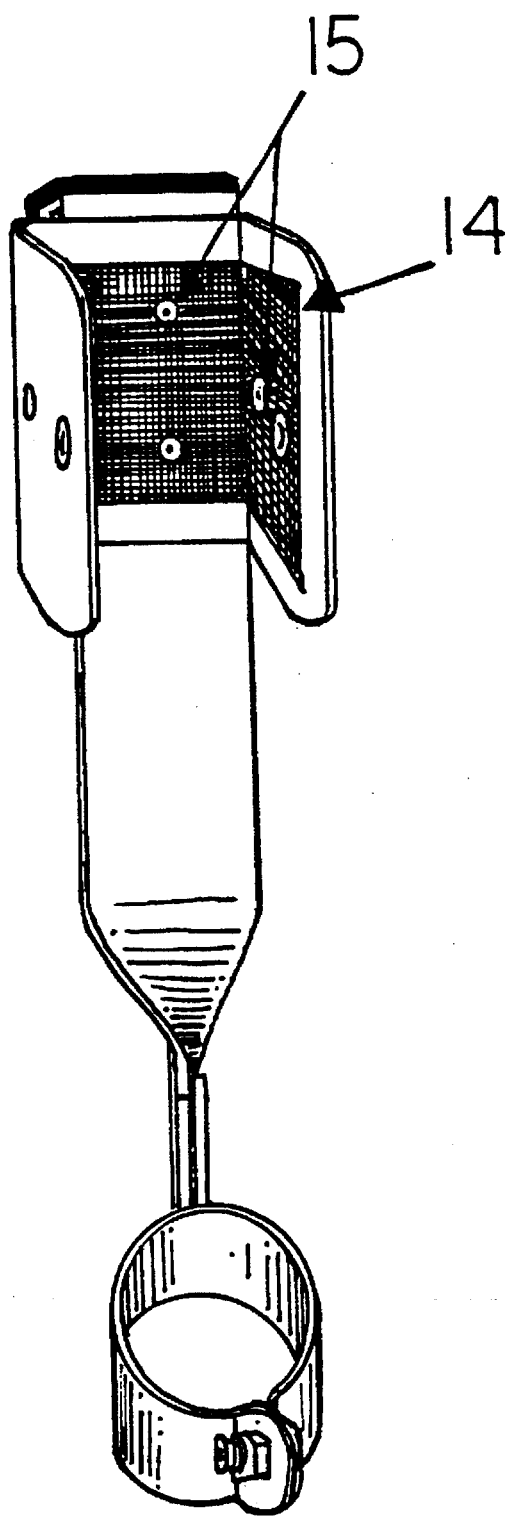
FIG. 2 is another view of the wiper, without the sponge, showing the Velcro attachment means permanently mounted to the wiping frame.

Turning now to FIG. 2, the Velcro surface 14 can be seen permanently attached to the inside of frame 9 using rivets 15. Other embodiments may provide Velcro surface 14 attached to frame 9 with glue or other adhesive.

Figure 3:
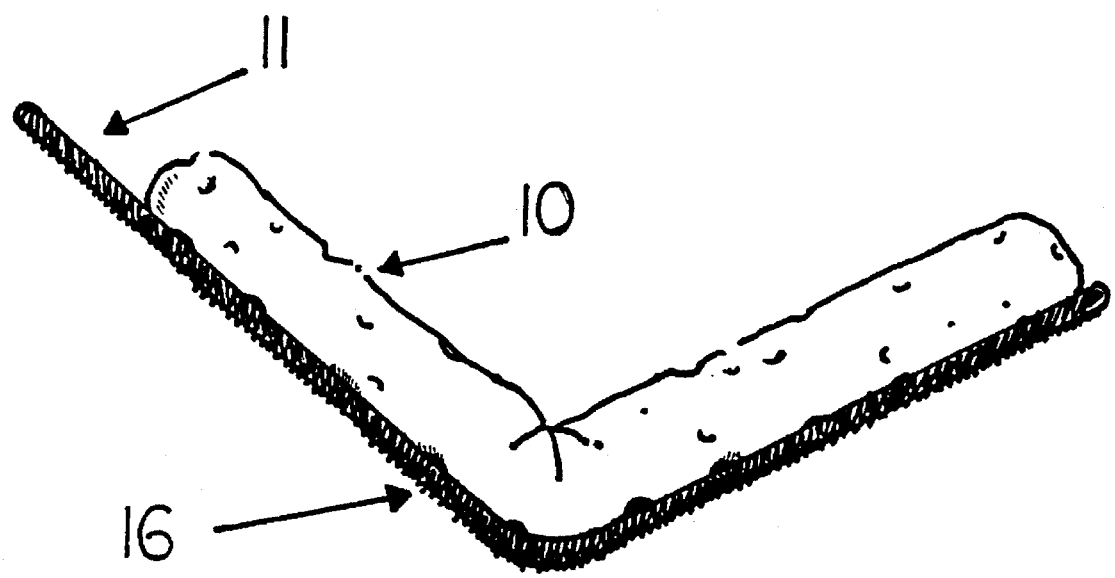
FIG. 3 is a view of the wiping sponge showing the Velcro surface used to attach the sponge to the wiper frame.

In FIG. 3, a top view of sponge 10 can be seen removed from frame 9. Velcro surface 16, that attaches to Velcro surface 14, is permanently affixed to the back side of sponge 10. Velcro tab 11 can be seen projecting from one end of Velcro surface 16. The user pulls Velcro tab 11 to remove Velcro surface 16 and sponge 10 from frame 9 when the user desires to change sponge 10.

Figure 4:
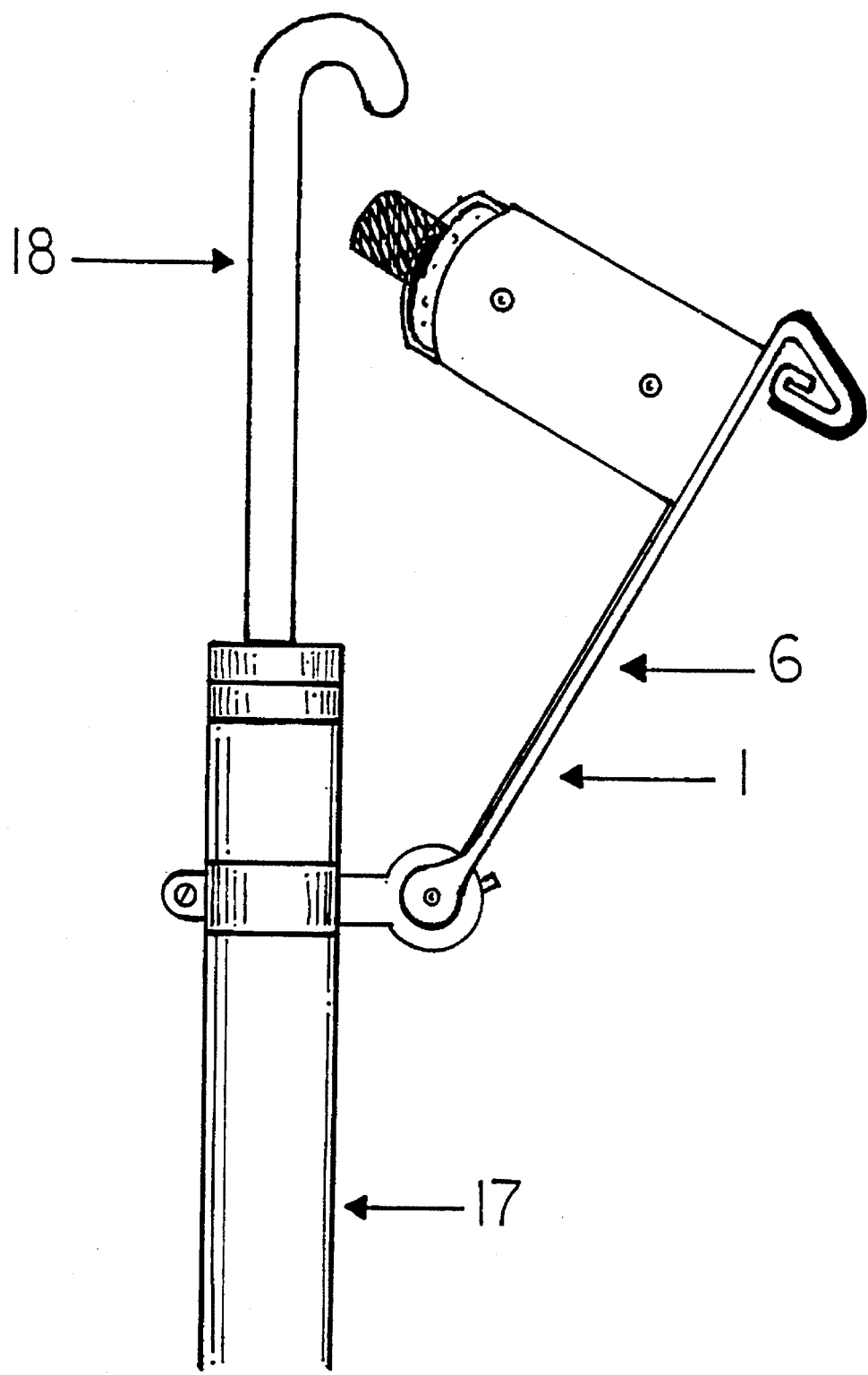
FIG. 4 is a view showing the wiper mounted on a dipstick tube, with the swing arm in a position away from the dipstick.

In FIG. 4, the wiper 1 can be seen installed on dipstick tube 17. In FIG. 4, swing arm 6 is positioned away from dipstick 18 as is the case when the wiper is not in use, or when the user is taking the oil level reading.

Figure 5:
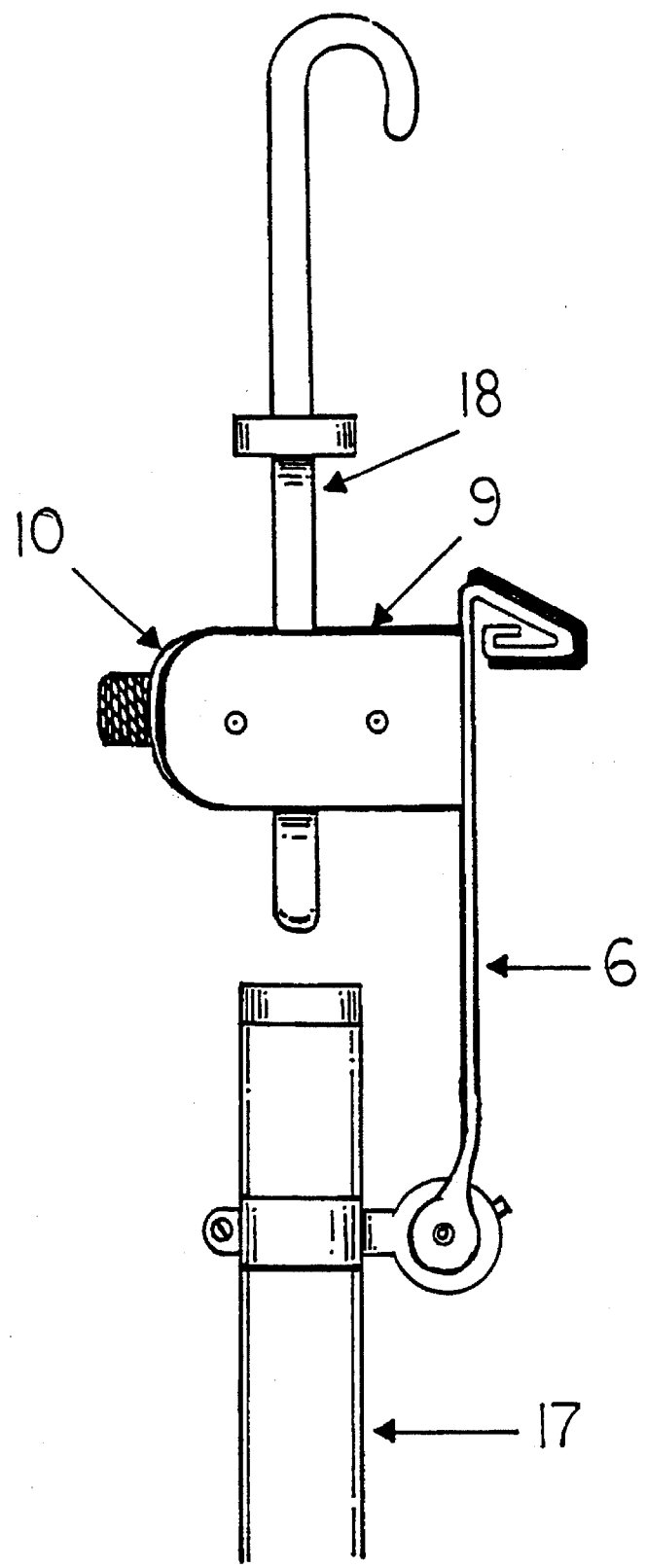
FIG. 5 is a view of the wiper mounted on a dipstick tube with the swing arm and frame engaged with the dipstick, and with the dipstick in the cleaning operation.

In FIG. 5, swing arm 6 is pivoted toward dipstick tube 17, putting frame 9 and sponge 10 over dipstick 18. In this position, the user squeezes both sides of frame 9 as dipstick 18 is pulled upward, thereby cleaning excess oil from the dipstick 18. From the foregoing detailed description of a specific embodiment of the invention, it should be apparent that a simple and easily operable dipstick oil wiper has been disclosed. While a specific embodiment of the invention has been described in detail, it is to be understood that various alterations, substitutions, and modifications can be made therein without departing from the spirit and scope of the present invention as defined in the appended claims.

I claim:

1. A dipstick oil wiper, comprising:
   (a) tube connection means to connect the wiper to a dipstick tube on an engine;
   (b) a swing arm having an upper end and a lower end, and being pivotally mounted to the tube connection means at the swing arm's lower end;
   (c) a frame rigidly mounted to the upper end of the swing arm;
   (d) a wiping medium removably attached to the frame by means of a hook and loop fastener element permanently affixed to the frame and a corresponding-hook and loop, fastener element permanently affixed to the wiping medium.

2. The dipstick oil wiper according to claim 1, wherein the hook and loop fastener element permanently affixed to the wiping medium further comprises a tab to facilitate removal of the wiping medium.

3. The dipstick oil wiper according to claim 1, wherein at least one fastening element is used to attach the hook and loop fastener element to the frame.

4. The dipstick oil wiper according to claim 1, wherein adhesive is used to attach the hook and loop fastener element to the frame.

5. The dipstick oil wiper according to claim 1 wherein a handle is provided on the upper end of the swing arm.

6. The dipstick oil wiper according to claim 5, wherein the handle on the swing arm is covered with a coating material.

7. The dipstick oil wiper according to claim 1, wherein the tube connection means is a clamp mountable with the dipstick tube, the clamp having an integral tab to provide a pivoting point for the lower end of the swing arm.

8. The dipstick oil wiper to claim 7, wherein the tab on the clamp further comprises a tang protruding from the tab to limit motion of the swing arm.

\* \* \* \* \*